United States Patent
Schroeder

(10) Patent No.: US 10,018,348 B2
(45) Date of Patent: Jul. 10, 2018

(54) TRANSDUCER AND TROLLING MOTOR LIGHTING DEVICE

(71) Applicant: Navico Holding AS, Egersund (NO)

(72) Inventor: Jeremy Schroeder, Sapulpa, OK (US)

(73) Assignee: NAVICO HOLDING AS, Egersund (NO)

( * ) Notice: Subject to any disclaimer, the term of this patent is extended or adjusted under 35 U.S.C. 154(b) by 50 days.

(21) Appl. No.: 14/863,859

(22) Filed: Sep. 24, 2015

(65) Prior Publication Data
US 2017/0089563 A1   Mar. 30, 2017

(51) Int. Cl.
| | | |
|---|---|---|
| *B63B 45/00* | (2006.01) | |
| *F21V 31/00* | (2006.01) | |
| *F21V 8/00* | (2006.01) | |
| *B63H 20/00* | (2006.01) | |
| *B63B 45/02* | (2006.01) | |
| *F21V 5/04* | (2006.01) | |
| *F21W 101/04* | (2006.01) | |
| *B63B 35/73* | (2006.01) | |
| *F21Y 115/10* | (2016.01) | |
| *F21W 107/20* | (2018.01) | |

(52) U.S. Cl.
CPC .............. *F21V 31/00* (2013.01); *B63B 45/02* (2013.01); *B63H 20/007* (2013.01); *G02B 6/0096* (2013.01); *B63B 2035/738* (2013.01); *B63B 2201/08* (2013.01); *F21V 5/04* (2013.01); *F21W 2101/04* (2013.01); *F21W 2107/20* (2018.01); *F21Y 2115/10* (2016.08)

(58) Field of Classification Search
CPC ........ F21V 31/00; F21V 31/005; F21V 31/03; F21V 31/04; F21Y 2101/02; F21Y 2115/10; B63H 20/007; B63B 45/02
See application file for complete search history.

(56) References Cited

U.S. PATENT DOCUMENTS

| | | | | |
|---|---|---|---|---|
| 3,502,861 A * | 3/1970 | Evans | .................... | A01K 75/02 362/477 |
| 4,805,337 A * | 2/1989 | Kurata | .................... | G01S 15/96 43/17.1 |
| 5,184,414 A * | 2/1993 | Downs | .................... | A01K 79/02 43/17.5 |
| 5,967,863 A * | 10/1999 | Marchant | ............... | B63G 13/02 181/206 |
| 6,652,331 B2 * | 11/2003 | Healey | ................. | B63H 20/007 114/144 E |
| 6,822,927 B1 * | 11/2004 | Holm | .................... | A01K 97/01 367/107 |

(Continued)

FOREIGN PATENT DOCUMENTS

GB   2455829 A * 6/2009 ............. B63B 45/02

*Primary Examiner* — Robert May
(74) *Attorney, Agent, or Firm* — Nelson Mullins Riley & Scarborough LLP

(57) ABSTRACT

Various implementations described herein are directed to providing lighting in an underwater transducer mounted to a boat. The transducer assembly includes a housing. The housing includes a transducer. The housing includes one or more lighting devices. The housing also includes an element integrated with an outer edge of the housing in a waterproof configuration. The element allows light from the one or more lighting devices to emanate outward from the outer edge of the housing.

20 Claims, 7 Drawing Sheets

(56) References Cited

U.S. PATENT DOCUMENTS

| | | | |
|---|---|---|---|
| 6,948,834 B2* | 9/2005 | Lilly | B63B 45/06 |
| | | | 362/477 |
| 7,106,359 B2* | 9/2006 | Fantone | A01K 79/00 |
| | | | 348/81 |
| 2015/0016130 A1* | 1/2015 | Davis | B63B 45/02 |
| | | | 362/477 |
| 2016/0207602 A1* | 7/2016 | Clark | G01S 15/89 |

* cited by examiner

TRANSDUCER AND TROLLING MOTOR LIGHTING DEVICE

BACKGROUND

There has been a surge in lighting applications for boaters. Boaters use these lights to provide underwater lighting and for fishing applications. However, one issue with present-day lighting kits is that holes are usually drilled into the hull of the boat to attach the lighting kit.

SUMMARY

Described herein are implementations of various technologies for providing lighting in an underwater transducer assembly mounted to a boat. The transducer assembly includes a housing. The housing includes a transducer and one or more lighting devices. The housing also includes an element integrated with an outer edge of the housing in an air-tight and/or waterproof configuration. The element allows light from the one or more lighting devices to emanate outward from the outer edge of the housing.

Described herein are also implementations of various for providing lighting in a trolling motor assembly mounted to a boat. The trolling motor assembly includes a housing. The housing includes a trolling motor and one or more lighting devices. The housing also includes an element integrated with an outer edge of the housing in an air-tight and/or waterproof configuration. The element allows light from the one or more lighting devices to emanate outward from the outer edge of the housing.

Conductor cables provide power to the one or more lighting devices. A sonar module and/or motor controller can be included within the housing. The element integrated with the outer edge of the housing can be a light pipe or a lens.

The one or more lighting devices can be placed on a circuit board within the housing. The one or more lighting devices can be part of a separate lighting unit within the housing. Each of the one or more lighting devices can also be include within an individual standalone unit within the housing.

Light from the one or more lighting devices may be configurable to point in any direction from the exterior of the housing. The one or more lighting devices can be implemented as multi-color light emitting diodes.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are described herein with reference to the accompanying drawings. It should be understood, however, that the accompanying drawings illustrate only the various implementations described herein and are not meant to limit the scope of various techniques described herein.

DETAILED DESCRIPTION

Many boaters use underwater devices such as motors or sonar for fish finding or other applications. Sonar systems use transducers as an antenna. Some transducers are attached within the hull of a boat. Some transducers are external transducers that are attached externally either through the transom or somewhere else on the hull of the boat.

A trolling motor is a unit that include a motor, propeller, and controls. The trolling motor is used as a secondary means of propulsion to aid a boater in fishing applications. The trolling motor is usually attached to the front (bow) or rear (transom) of the boat.

The present disclosure provides a lighting application for boaters with a sonar system and/or a trolling motor that avoids the drilling of further holes into the hull. Accordingly, in one implementation a new lighting feature is added to the external transducer. In another implementation, the lighting feature is added to the trolling motor installed on the boat. This lighting feature can be used in many applications, for example, recreational use, fishing applications, to determine which way the transducer is pointing, and to determine the direction of the trolling motor.

Various implementations of incorporating lighting in a transducer and/or trolling motor will now be described in reference to FIGS. 1-6.

Figure 1:
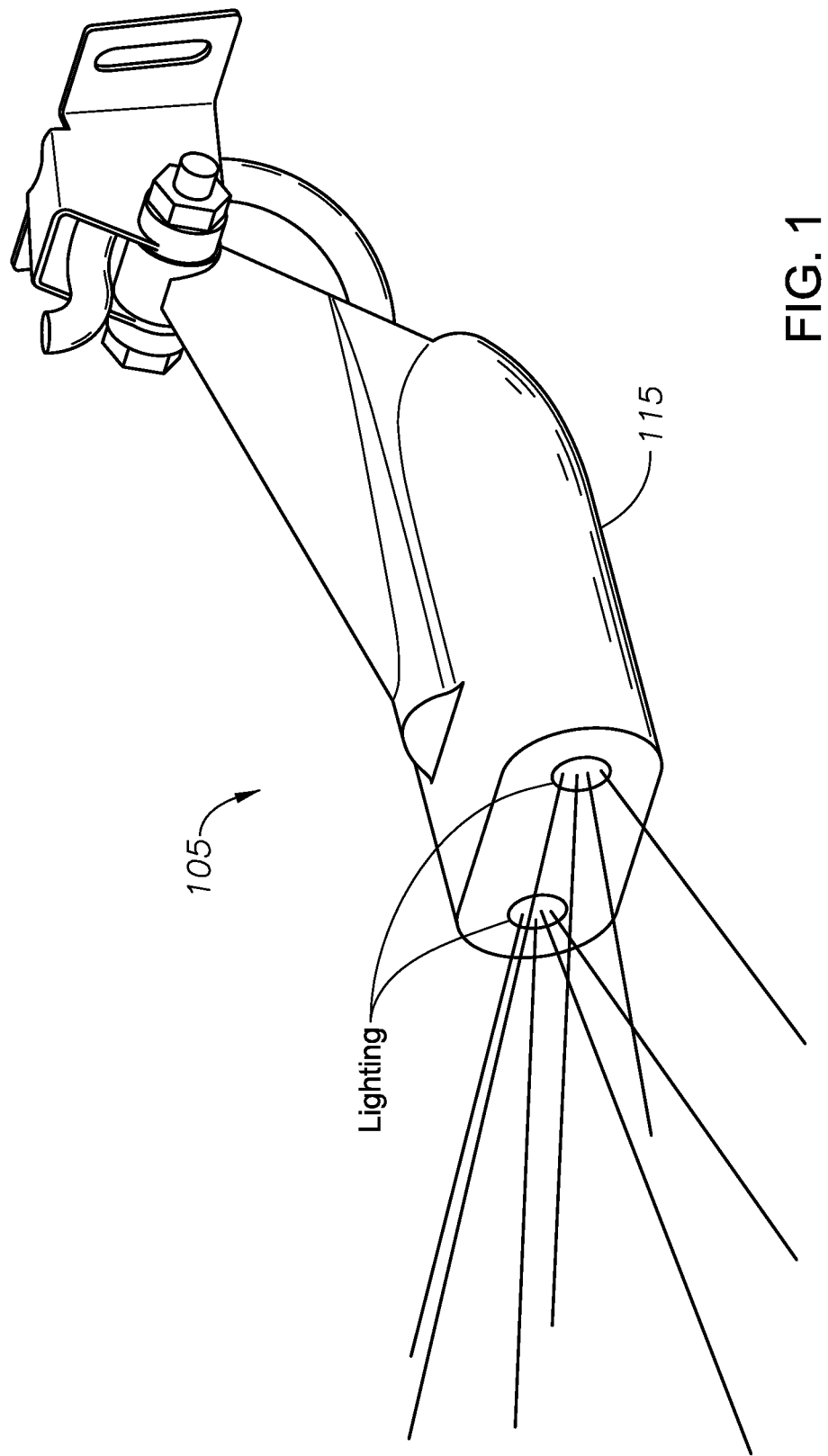
FIG. 1 illustrates a view of a transducer with lighting in accordance with various implementations described herein.

FIG. 1 illustrates a transducer 105 in accordance with various implementations described herein. A housing 115 of the transducer 105 includes a sonar system (not shown) and lenses or light pipes, which provide an air-tight and/or waterproof fit with an outer edge portion of the housing 115 of the transducer 105. The lenses or light pipes allow light from one or more lighting devices within the housing 115 of the transducer 105 to emanate outward from the outer edge of the housing 115 of the transducer 105 in one or more directions and/or in one or more colors. The one or more lighting devices can be one or more light emitting diodes (LEDs), fiber optic lighting, or some other form of high intensity lighting.

Figure 2:
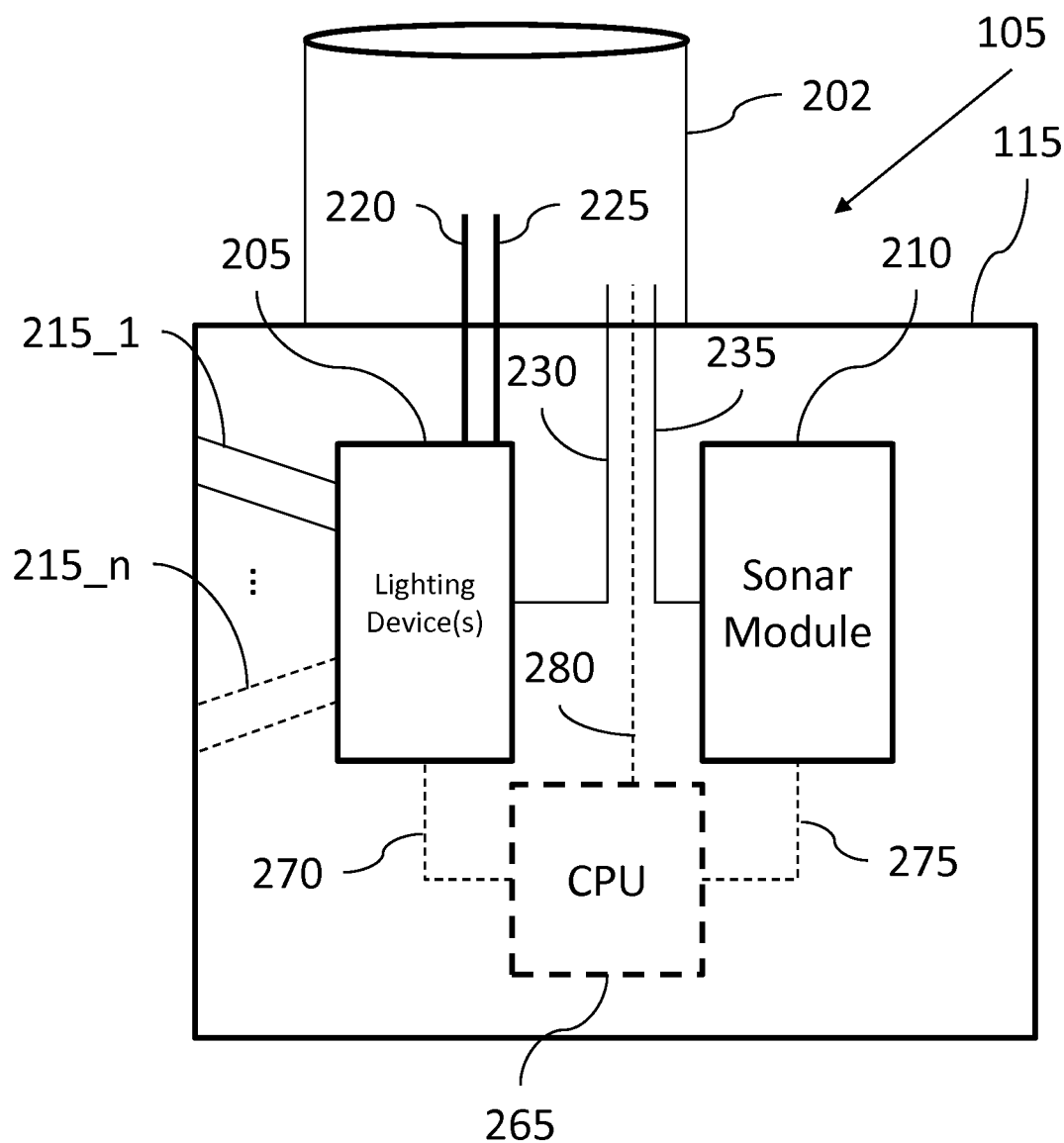
FIG. 2 illustrates a diagram of a transducer with lighting in accordance with various implementations described herein.

FIG. 2 illustrates a block diagram of the transducer 105 of FIG. 1, according to various implementations described herein. The transducer 105 includes sonar module 210, one or more lighting devices 205, one or more light pipes or lenses 215 ($215\_1$ to $215\_n$), and conductor cables or wires 220, 225. The lenses or light pipes 215 provide an air-tight and/or waterproof fit with an outer edge portion of the housing of the transducer 105. The lenses or light pipes 215 magnify the light from the one or more lighting devices 205 and allow the light from the one or more lighting devices 205 within the housing 115 of the transducer 105 to emanate outward from the outer edge of the housing 115 of the transducer 105 in one or more directions and/or in one or more colors. The one or more lighting devices 205 are powered by conductor wires 220, 225 and light produced by the one or more lighting devices 205 passes through light pipes or lenses 215 and out from an exterior surface of transducer 105. The one or more lighting devices 205 are controlled by line 230. Line 230 can either be controlled by a switch (not shown) or a multi-functional display (MFD) (not shown), which is installed somewhere on the boat within reach of the boater. The MFD can also be referred to as a head unit or marine electronics device. The sonar module 210 sends and receives signals (e.g., information, commands) from the MFD as well via line 235. Lines 220, 225, 230, 235, 280 pass through a shaft 202 coupled to the housing 115 in an air-tight and/or waterproof configuration. Shaft 202 may also be a flexible cable or conduit.

In one implementation, the one or more lighting devices 205 can be placed on a circuit board (not shown) of the transducer 105. In another implementation, the one or more lighting devices 205 can be part of a separate LED unit or module. In yet another implementation, the one or more lighting devices 205 can be individual standalone units that are each individually powered and placed near a corresponding lens or light pipe.

Most existing transducers include circuit boards. In the circuit board implementation, the one or more lighting devices 205 are mounted to the circuit board of the transducer 105. Here, lines 220, 225, 230 and optional line 270 are coupled to the one or more lighting devices 205 through a printed circuit board.

In the implementation where the one or more lighting devices 205 are part of a separate unit or module, this separate unit or module is discretely coupled to the conductor cables or wires 220, 225. In the implementation where the one or more lighting devices 205 are individual standalone units, each individual standalone unit is discretely coupled to the conductor cables or wires 220, 225.

In one implementation, the one or more lighting devices 205 and/or the sonar module 210 can be controlled by optional central processing unit (CPU) 265. In this embodiment, the CPU 265 communicates with the MFD via line 280. The CPU 265 communicates with the one or more lighting devices 205 via line 270. The CPU 265 communicates with the sonar module via line 275. The CPU 265 can be a standalone unit or be coupled to other components through a circuit board.

Figure 3:
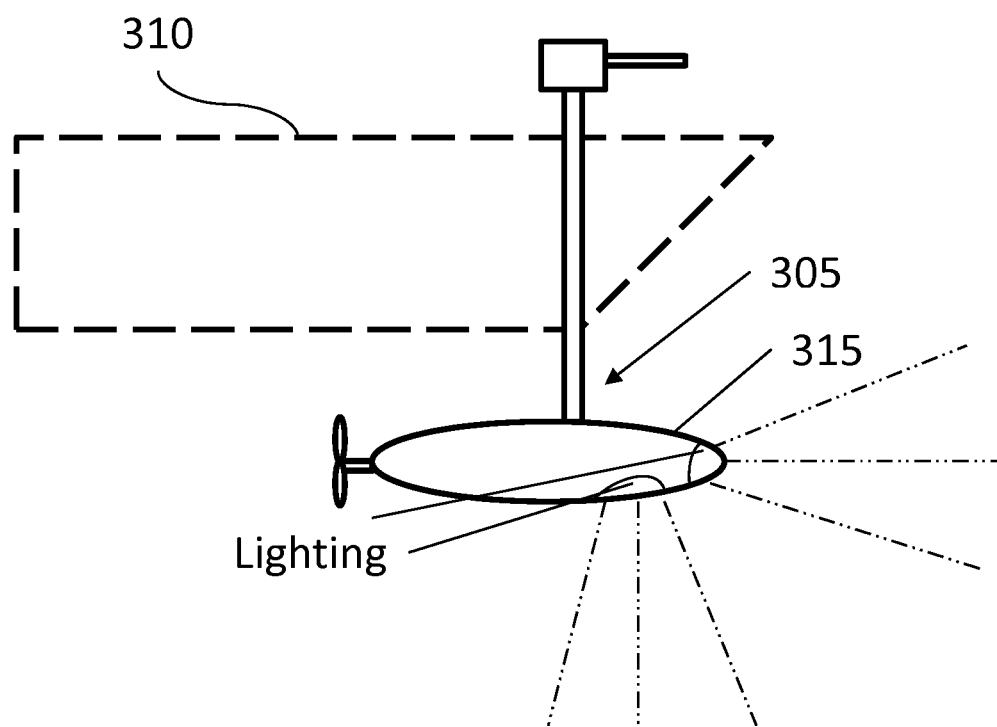
FIG. 3 illustrates a view of a trolling motor with lighting in accordance with various implementations described herein.

FIG. 3 illustrates a trolling motor 305 in accordance with various implementations described herein. The trolling motor 305 includes a housing 315 configured to encapsulate elements including a trolling motor (not shown), a trolling motor controller (not shown), and lenses or light pipes, which provide an air-tight and/or waterproof fit with an outer edge portion of the housing 315 of the trolling motor 305. The lenses or light pipes allow light from one or more lighting devices within the housing 315 of the trolling motor 305 to emanate outward from the outer edge of the housing 315 of the trolling motor 305 in one or more directions and/or in one or more colors. Although the trolling motor 305 is shown as being mounted to a front portion of boat 310, the trolling motor can also be mounted on a transom or rear portion of the boat 310. The one or more lighting devices can be one or more light emitting diodes (LEDs), fiber optic lighting, or some other form of high intensity lighting.

Figure 4:
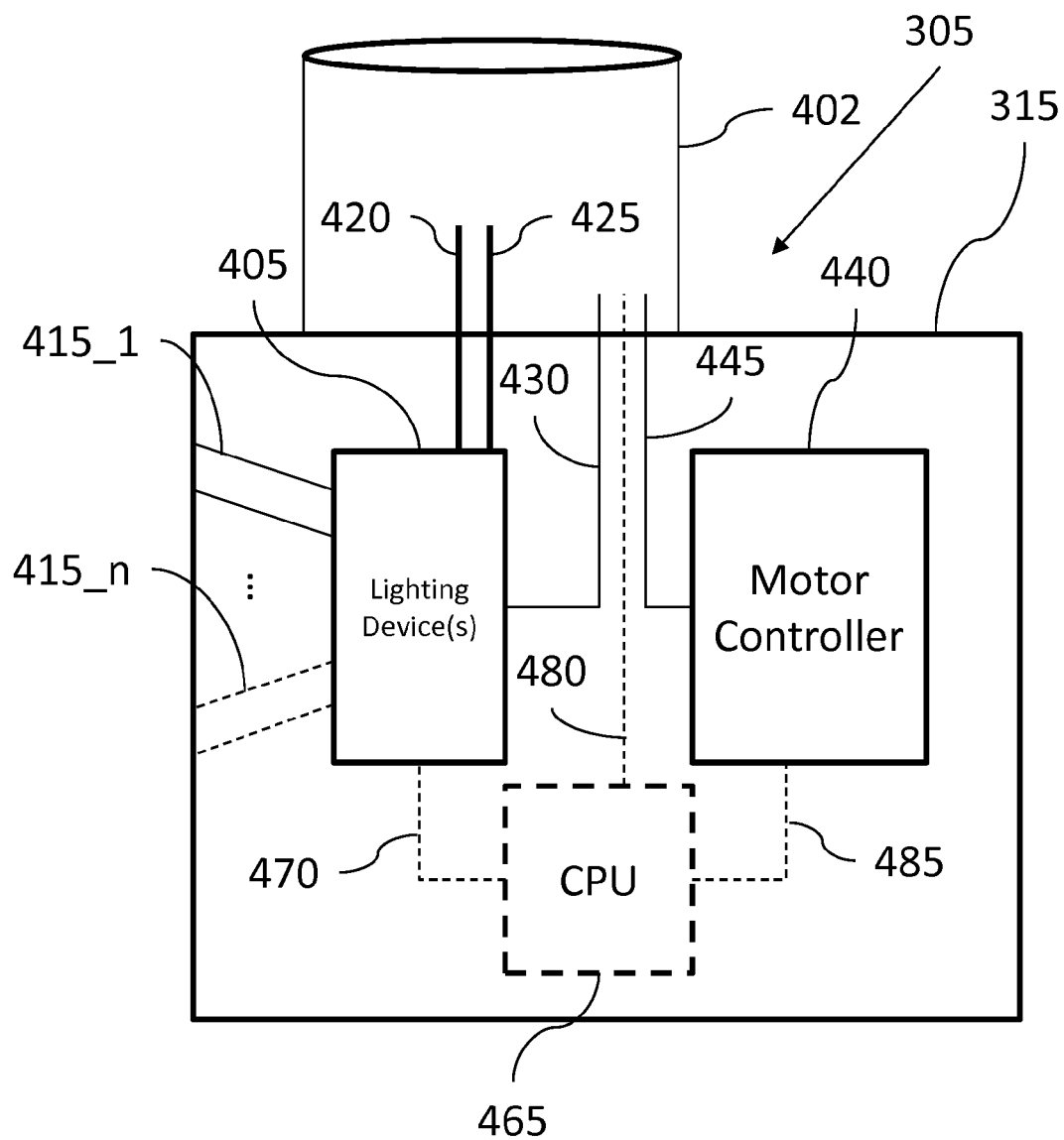
FIG. 4 illustrates a diagram of a trolling motor with lighting in accordance with various implementations described herein.

FIG. 4 illustrates a block diagram of the trolling motor 305 of FIG. 3, according to various implementations described herein. The housing 315 of trolling motor 305 includes motor controller 440, one or more lighting devices 405, one or more light pipes or lenses 415 (415_1 to 415_$n$), and conductor cables or wires 420, 425. The lenses or light pipes 415 provide an air-tight and/or waterproof fit with an outer edge portion of the housing 315 of the trolling motor 305. The lenses or light pipes 415 magnify the light from the one or more lighting devices 405 and allow the light from the one or more lighting devices 405 within the housing 315 of the trolling motor 305 to emanate outward from the outer edge of the housing 315 of the trolling motor 305 in one or more directions and/or in one or more colors. The one or more lighting devices 405 are powered by conductor wires 420, 425 and light produced by the one or more lighting devices 405 passes through light pipes or lenses 415 and out from an exterior surface of trolling motor 305. The one or more lighting devices 405 are controlled by line 430. Line 430 can either be controlled by a switch (not shown) or a multi-functional display (MFD) (not shown), which is installed somewhere on the boat within reach of the boater. The MFD can also be referred to as a head unit or marine electronics device. Motor controller 440 sends and receives signals (e.g., information, commands) to/from the MFD as well via line 445. Lines 420, 425, 430, 445, 480 pass through a shaft 402 coupled to the housing 315.

In one implementation, the one or more lighting devices 405 can be placed on a circuit board (not shown) of trolling motor 305. In another implementation, the one or more lighting devices 405 can be part of a separate LED unit or module. In yet another implementation, the one or more lighting devices 405 can be individual standalone units that are each individually powered and placed near a corresponding lens or light pipe.

Most existing transducers include circuit boards. In the circuit board implementation, the one or more lighting devices 405 are mounted to the circuit board of the trolling motor 305. In this case, lines 420, 425, 430 and optional line 470 are coupled to the one or more lighting devices 405 through a printed circuit board.

In the implementation where the one or more lighting devices 405 are part of a separate unit or module, this separate unit or module is discretely coupled to the conductor cables or wires 420, 425. In the implementation where the one or more lighting devices 405 are individual standalone units, each individual standalone unit is discretely coupled to the conductor cables or wires 420, 425.

In one implementation, the one or more lighting devices 405 and/or the motor controller 440 can be controlled by optional central processing unit (CPU) 465. In this embodiment, CPU 465 communicates with the MFD via line 480. CPU 465 communicates with the one or more lighting devices 405 via line 470. CPU 465 communicates with the motor controller 440 via line 485. CPU 465 can be a standalone unit or be coupled to other components through a circuit board.

Figure 5:
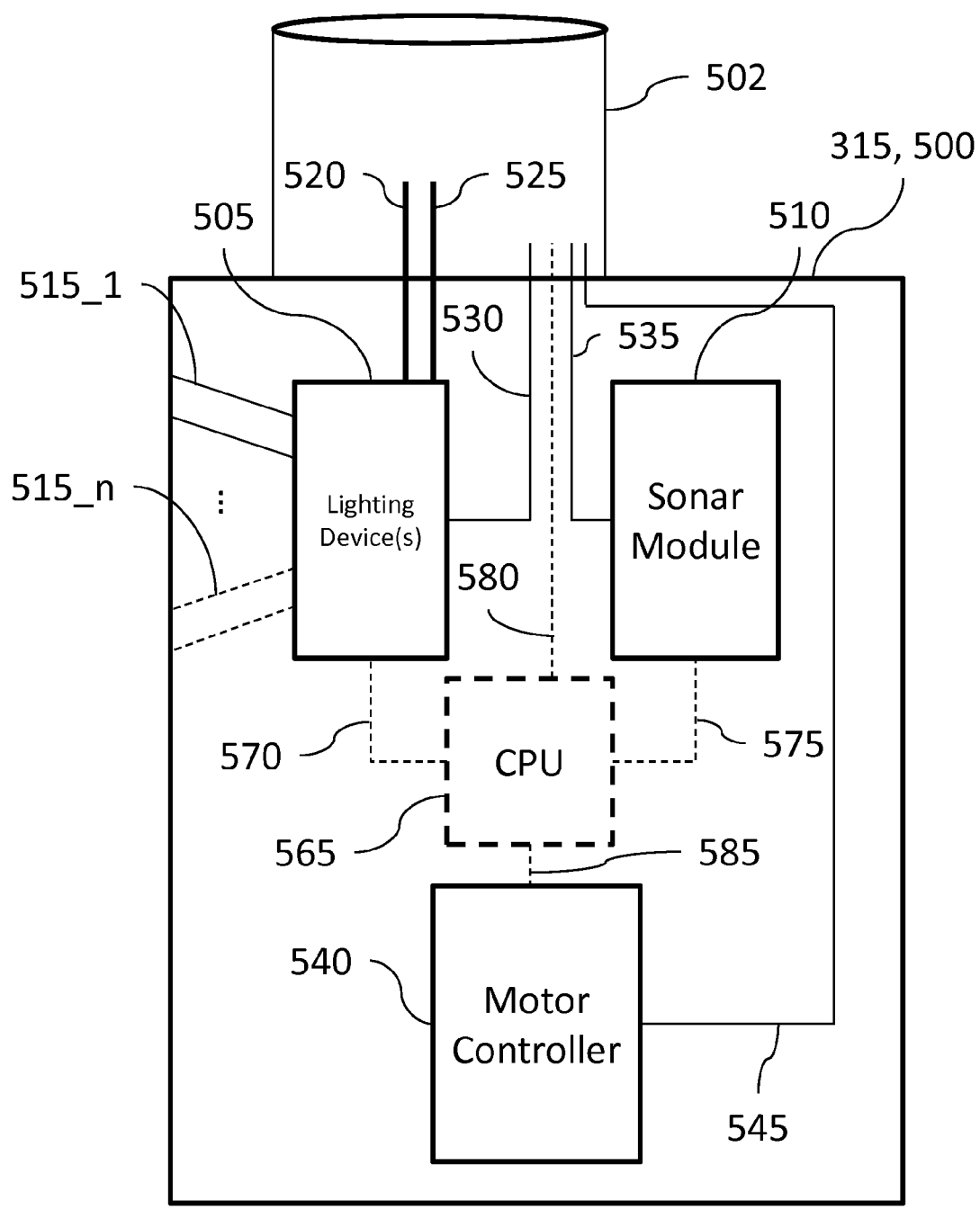
FIG. 5 illustrates a diagram of a trolling motor incorporating lighting and a sonar module in accordance with various implementations described herein.

FIG. 5 illustrates a block diagram of a trolling motor 500, according to various implementations described herein. Trolling motor 500 is similar to trolling motor 305, however, in this implementation, the housing 315 of trolling motor 500 includes a sonar module 510. Trolling motor 500 includes elements 500, 502, 505, 510, 515, 520, 525, 530, 535, 540, 545, 565, 570, 575, and 580. These elements are the same or similar to elements 210, 235, 275, 305, 402, 405, 415, 420, 425, 430, 440, 445, 465, 470, 480, and 485, which are described in detail above with reference to FIG. 2 and FIG. 4.

Figure 6:
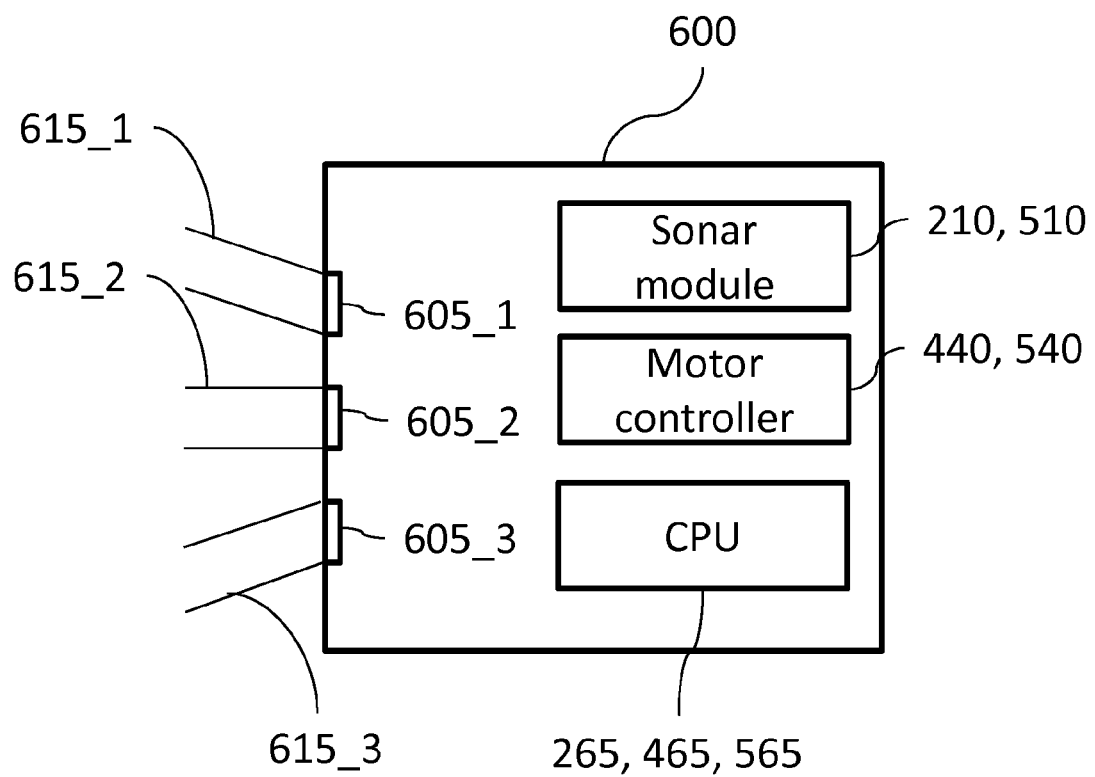
FIG. 6 illustrates a diagram of a circuit board in accordance with various implementations described herein.

FIG. 6 illustrates a block diagram of an example circuit board 600. Circuit board 600 is included within housing 115, 315. Individual LEDs 605_1, 605_2, 605_3 are placed on circuit board 600. Corresponding light pipes or lenses 615_1, 615_2, 615_3 allow the light generated by LEDs 605_1, 605_2, 605_3 to emanate externally from housing 115, 315. Circuit board 600 also includes sonar module 210, 510, motor controller 440, 540, and/or CPU 265, 465, 565. Circuit board 600 can be any type of circuit board. In one implementation, circuit board 600 is a printed circuit board.

Light from the lighting devices 205, 405, 505 can be configured to point in any direction from the exterior of the housings 115, 315 of the transducer 105 or the trolling motor 305, 500.

In one implementation, the transducer 105 is mounted to a transom of the boat. In one configuration, light from the one or more lighting devices 205 can point back (e.g., like brake lights) and/or down. In another configuration, the lights from one or more lighting devices 205 can point in each acoustic direction provided by the sonar module 210. In yet another configuration the lights from one or more lighting devices 205 can point down, a number of degrees (e.g., 1 degree to 90 degrees) to the left of the down position, and a number of degrees (e.g., 1 degree to 90 degrees) to the right of the down position.

In one implementation, the trolling motor 305, 500 is mounted to a front portion of the boat. In one configuration, light from the one or more lighting devices 405, 505 points forward. In this configuration, the forward pointing light from the one or more lighting devices 405, 505 indicate a direction that the trolling motor is pointed. In another configuration, the lights from lighting devices 405, 505 can point in each acoustic direction provided by the sonar module 410, 510. In yet another configuration the lights from lighting devices 405, 505 can point down, a number of degrees (e.g., 1 degree to 90 degrees) to the left of the down position, and a number of degrees (e.g., 1 degree to 90 degrees) to the right of the down position.

One or more lighting devices 205, 405, 505 can be used. However, increasing the number of lighting devices will also increase the power that is needed.

The lighting can be provided in different colors. In one implementation, the lighting devices are multi-color LEDs. As such, the color of each individual LED may be controllable by switch, MFD, or optional CPU 265, 465, 565.

Placing the one or more lighting devices 205, 405, 505 near a corresponding light pipe or lens allows light to shine through the transducer and/or trolling motor. Providing lighting with a transducer and/or trolling motor reduces costs for a boat owner because the present transducer and/or trolling motor eliminates the need for the boat owner to purchase and install a separate lighting system.

In some implementations, the lighting device(s) 205, 405, 505, 605 sonar module 210, 510, motor controller 440, 540, and/or CPU 265, 465, 565 may be electrically coupled to a computing device via one or more electrical wires or cables 230, 235, 280, 430, 445, 480, 530, 535, 545, 580 passing through the shaft 202, 402, 502. The computing device may be a marine electronics device (e.g., multi-function display (MFD), smart phone, etc.) for recording sonar data signals received from the transducer array via the electrical cables. The computing device 700 may also be configured for controlling operation of the motor via the electrical cables. The computing device may also be configured for controlling operation of the lighting devices in the transducer or trolling motor. Thus, control signals may be transmitted from the computing device to the motor via the electrical cables 230, 430, 530 for controlling operation of the lighting device(s) 205, 405, 505, 605. In some instances, operation of the lighting devices is controlled by the computing device 700 including user interaction with the computing device. In some other instances, operation of the motor may be controlled via user interaction with a switch (not shown) positioned on the boat.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 7:
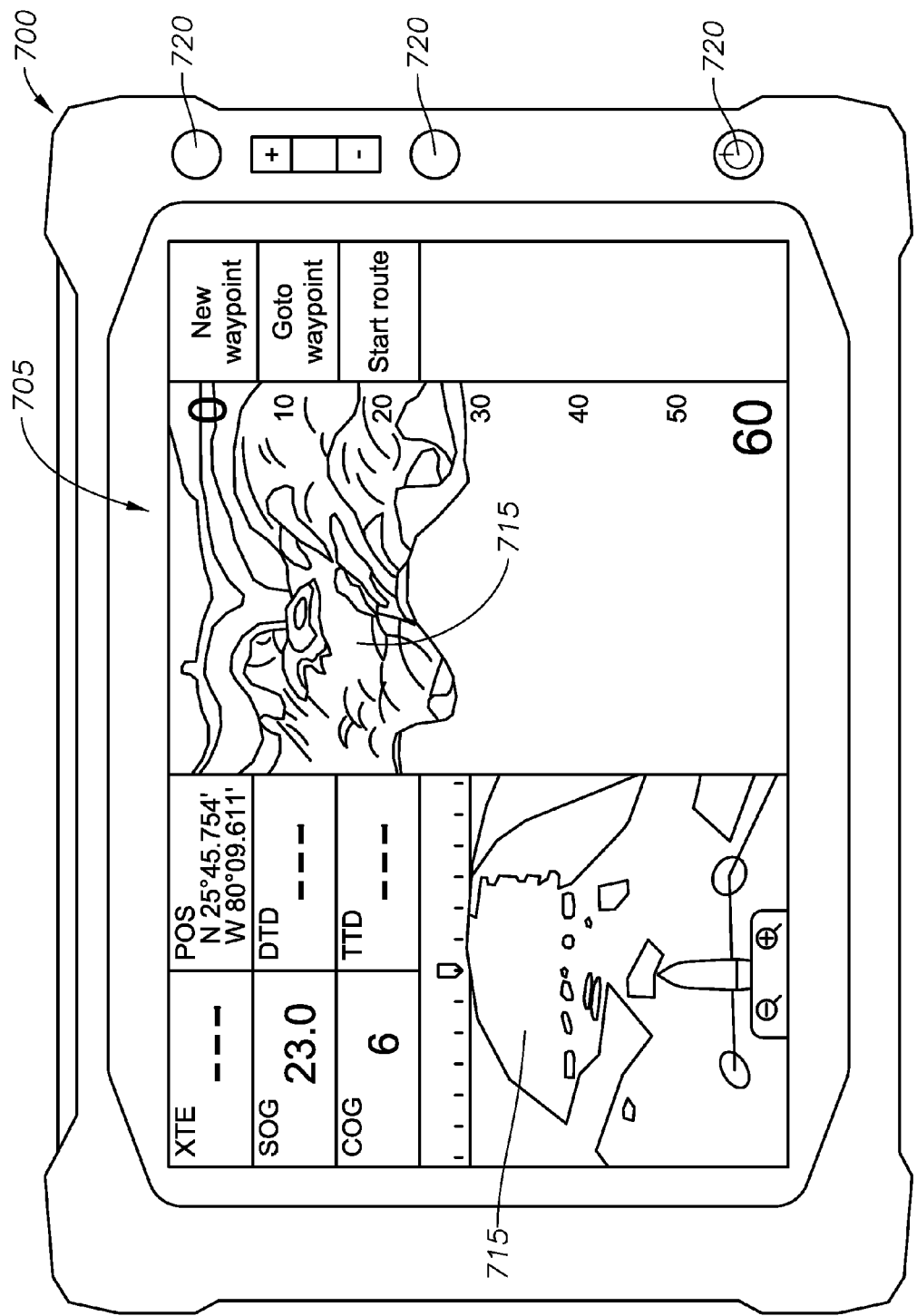
FIG. 7 illustrates a marine electronics device in accordance with various implementations described herein.

In one implementation, the computing device is a marine electronics device, e.g., a MFD. FIG. 7 illustrates an example schematic of a marine electronics device 700 in accordance with implementations of various techniques described herein. The marine electronics device 700 includes a screen 705. In certain implementations, the screen 705 may be sensitive to touching by a finger. In other implementations, the screen 705 may be sensitive to the body heat from the finger, a stylus, or responsive to a mouse. The marine electronics device 700 may be attached to a National Marine Electronics Association (NMEA) bus or network. The marine electronics device 700 may send or receive data to or from another device attached to the NMEA 2000 bus. For example, the marine electronics device 700 may transmit commands and receive data from a motor or a sensor using an NMEA 2000 bus. In one implementation, the marine electronics device 700 may be capable of steering a vessel and controlling the speed of the vessel, i.e., autopilot. For example, one or more waypoints may be input to the marine electronics device 700, and the marine electronics device 700 may steer a vessel to the one or more waypoints. The marine electronics device 700 may transmit or receive NMEA 2000 compliant messages, messages in a proprietary format that do not interfere with NMEA 2000 compliant messages or devices, or messages in any other format. In various implementations, the marine electronics device 700 may be attached to various other communication buses and/or networks configured to use various other types of protocols that may be accessed via, e.g., NMEA 2000, NMEA 0183, Ethernet, Proprietary wired protocol, etc. In some implementations, the marine electronics device 700 may communicate with other devices on the vessel via wireless communication protocols.

In one implementation, the marine electronics device 700 may communicate with one or more of the lighting 205, 405, 505, 605 the sonar module 210, 510, the motor controller 440, 540, and the CPU 265, 465, 565 via wireless communication protocols instead of using wires 230, 235, 280, 430, 445, 480, 530, 535, 545, 580.

The marine electronics device 700 may be operational with numerous general purpose or special purpose computing system environments or configurations. The marine electronics device 700 may include any type of electrical and/or electronics device capable of processing data and information via a computing system. The marine electronics device 700 may include a marine instrument, such that the marine electronics device 700 may use the computing system to display and/or process the one or more types of marine electronics data. The marine electronics device 700 may be configured to display marine electronic data 715, such as, e.g., chart data, radar data, sonar data, steering data, dashboard data, navigation data, fishing data, engine data, lighting operation data, and the like. Further, the marine electronics device 700 may also include one or more buttons 720 that may include either physical buttons or virtual buttons, or a combination thereof. Still further, the marine electronics device 700 may receive input through a screen 705 sensitive to touch or buttons 720.

The computing system may include a central processing unit (CPU), a system memory, a graphics processing unit (GPU), and a system bus that couples various system components including the system memory to the CPU. The computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor (MFD 700). The monitor (MFD 700) includes a screen 705. In certain implementations, the screen 705 may be sensitive to touching by a finger. In other implementations, the screen 705 may be sensitive to the body heat from the finger, a stylus, or responsive to a mouse.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some examples, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for example, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 700 is disposed. The GPS receiver system may then transmit the position data to the marine electronics device 700. In other examples, any positioning system known to those skilled in the art may be used to determine and/or provide the position data for the marine electronics device 700.

The marine electronics system may include one or more components disposed at various locations on the vessel. Such components may include one or more data modules, sensors, instrumentation, and/or any other devices known to those skilled in the art that may transmit various types of data to the marine electronics device 700 for processing and/or display. The various types of data transmitted to the marine electronics device 700 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type known to those skilled in the art.

In one implementation, the marine electronics system may include a radar sensor for recording the radar data and/or the Doppler data, a compass heading sensor for recording the heading data, and a position sensor for recording the position data. In a further implementation, the marine electronics system may include a sonar transducer for recording the sonar data, an AIS transponder for recording the AIS data, a paddlewheel sensor for recording the speed data, and/or the like.

The marine electronics device 700 may receive external data via the LAN or the WAN. In one implementation, the external data may relate to information not available from the marine electronics system. The external data may be retrieved from the Internet or any other source. The external data may include atmospheric temperature, tidal data, weather, moon phase, sunrise, sunset, water levels, historic fishing data, and other fishing data.

In one implementation, the marine electronics device 700 may be a multi-function display (MFD) unit, such that the marine electronics device 700 may be capable of displaying and/or processing multiple types of marine electronics data. FIG. 7 illustrates a schematic diagram of an MFD unit in accordance with implementations of various techniques described herein. In particular, the MFD unit may include the computing system, the monitor (MFD 700), the screen 705, and the buttons such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A trolling motor assembly, comprising:
   a trolling motor housing;
   a transducer;
   one or more lighting devices; and
   at least one element integrated with an outer edge of the trolling motor housing in a waterproof configuration, wherein the at least one element is oriented to allow light from the one or more light emitting diodes to emanate outward from the outer edge of the trolling motor housing in a generally downward and outward direction from the trolling motor housing.

2. The trolling motor assembly of claim 1, further comprising conductor cables that provide power to the one or more lighting devices.

3. The trolling motor assembly of claim 1, further comprising a sonar module within the trolling motor housing.

4. The trolling motor assembly of claim 1, wherein the at least one element comprises a light pipe.

5. The trolling motor assembly of claim 1, wherein the at least one element comprises a lens.

6. The trolling motor assembly of claim 1, wherein the trolling motor housing further includes a single printed circuit board, wherein both the one or more lighting devices and a sonar module of the transducer are placed on the single printed circuit board.

7. The trolling motor assembly of claim 1, wherein the one or more lighting devices are part of a separate lighting unit within the trolling motor housing.

8. The trolling motor assembly of claim 1, wherein each of the one or more lighting devices is an individual standalone unit within the trolling motor housing.

9. The trolling motor assembly of claim 1, wherein the one or more lighting devices comprise tri-color light emitting diodes.

10. A trolling motor assembly, the trolling motor assembly comprising:
    a housing defining a front and a back, wherein the housing includes:
        a trolling motor;
        one or more lighting devices;
        at least one element integrated with an outer edge of the housing in a waterproof configuration, wherein the at least one element is oriented to allow light from the one or more lighting devices to emanate outward from the outer edge of the housing in a generally downward and outward direction from the front of the housing such that light from the one or more lighting devices indicates a direction that the trolling motor is pointed.

11. The trolling motor of claim 10, further comprising conductor cables that provide power to the one or more lighting devices.

12. The trolling motor of claim 10, wherein the at least one element comprises a light pipe.

13. The trolling motor of claim 10, wherein the at least one element comprises a lens.

14. The trolling motor of claim 10, wherein the housing further includes a single printed circuit board, wherein both the one or more lighting devices and a controller for the trolling motor are placed on the single circuit board within the housing.

15. The trolling motor of claim 10, wherein the one or more lighting devices are part of a separate lighting unit within the housing.

16. The trolling motor of claim 10, wherein each of the one or more lighting devices is an individual standalone unit within the housing.

17. The trolling motor of claim 10, wherein the one or more lighting devices comprise tri-color light emitting diodes.

18. A trolling motor assembly, the trolling motor assembly comprising:

a housing defining a front and a back, wherein the housing includes:
a transducer;
a trolling motor;
one or more lighting devices; and
at least one element integrated with an outer edge of the housing in a waterproof configuration, wherein the at least one element is oriented to allow light from the one or more lighting devices to emanate outward from the outer edge of the housing in a generally downward and outward direction from the front of the housing such that light from the one or more lighting devices indicates a direction that the trolling motor is pointed.

19. The trolling motor assembly of claim 18, wherein the housing further includes a single printed circuit board, wherein all of the one or more lighting devices, a sonar module of the transducer, and a controller for the trolling motor are placed on the single circuit board within the housing.

20. The trolling motor of claim 18, further comprising conductor cables that provide power to the one or more lighting devices.

\* \* \* \* \*